United States Patent [19]

Munday et al.

[11] 4,298,955
[45] Nov. 3, 1981

[54] METHOD OF AND APPARATUS FOR THE DETECTION AND ANALYSIS OF HAZARDS

[75] Inventors: George Munday, London; David H. Slater, Berkshire; Leonard R. T. Tyley; Brian J. Berenblut, both of London; Harry B. Whitehouse, Sevenoaks, all of England

[73] Assignee: The Insurance Technical Bureau, London, England

[21] Appl. No.: 780,307

[22] Filed: Mar. 23, 1977

[30] Foreign Application Priority Data

Apr. 1, 1976 [GB] United Kingdom ............... 13296/76
Aug. 25, 1976 [GB] United Kingdom ............... 35329/76

[51] Int. Cl.³ .................... G06F 11/34; G06F 15/46
[52] U.S. Cl. .................................... 364/900; 364/108; 364/500
[58] Field of Search ... 364/200 MS File, 900 MS File, 364/108, 500, 570, 571, 501, 502, 503, 109; 340/146.1 AB; 371/26

[56] References Cited

U.S. PATENT DOCUMENTS

| | | | |
|---|---|---|---|
| 3,636,331 | 1/1972 | Amrehn | 364/200 |
| 3,710,350 | 1/1973 | Yoshitake et al. | 364/200 |
| 3,744,024 | 7/1973 | Russell et al. | 340/146.1 AB |
| 3,761,882 | 9/1973 | Bartlett et al. | 364/200 |
| 3,761,889 | 9/1973 | Hallee et al. | 364/200 |
| 3,922,642 | 9/1975 | Tooka | 364/200 |
| 3,937,934 | 2/1976 | Pasemann | 364/108 X |
| 3,971,000 | 7/1976 | Cromwell | 364/200 |
| 4,001,785 | 1/1977 | Miyazaki et al. | 364/200 |
| 4,028,666 | 6/1977 | Suzuki et al. | 364/200 |

Primary Examiner—Gareth D. Shaw
Assistant Examiner—Thomas M. Heckler
Attorney, Agent, or Firm—McAulay, Fields, Fisher, Goldstein & Nissen

[57] ABSTRACT

The invention provides a system for detecting and analysing deviations from normal in the operating conditions of a process, for example a chemical manufacturing process. The system comprises transducers positioned to detect a plurality of operating parameters and generate signals representative of the said parameters. A processing device is connected to receive the signals and programmed to analyse the signals on the basis of a decision table having columns each of which represents a different combination of operating parameter values. Each column has associated therewith a value representing the seriousness of the deviation represented by the combination of values. Means are provided for displaying, storing and/or recording the nature of each deviation analysed by the processing device and the value associated therewith. Systems for transmitting data from transducers to a receiver and for analysing data are also provided.

19 Claims, 6 Drawing Figures

METHOD OF AND APPARATUS FOR THE DETECTION AND ANALYSIS OF HAZARDS

BACKGROUND OF THE INVENTION

This invention relates to a method of and apparatus for the detection and analysis of deviations from normal in the operating conditions in a variety of processes, for example, chemical manufacturing processes. The invention is particularly, though not exclusively, concerned with the detection and analysis of hazards. The invention also relates to various applications of methods and apparatuses derived therefrom to other contexts.

SUMMARY OF THE INVENTION

A first aspect of the invention provides a system for detecting and analysing deviations from normal in the operating conditions of a process, comprising a plurality of transducers positioned to detect a plurality of operating parameters and generate signals representative of the said parameters, a processing device connected to receive the said signals and programmed to analyse the said signals on the basis of a decision table having columns each of which represents a different combination of operating parameter values, each column having associated therewith an importance value representing the seriousness of the deviation represented by the combination of values, and receiving means for displaying, storing and/or recording the nature of each deviation analysed by the processing device together with or on the basis of the said value associated therewith, and/or effecting control of the said process on the basis of each deviation and the said value associated therewith.

A second aspect of the invention provides a system for transmitting data from a transducer to a data receiver comprising a data transmission checking device connected between at least one of the transducers and the data receiver, the checking device comprising means adjacent the transducer for dividing the range over which a parameter value to be transmitted may vary into a plurality of bands and allocating the parameter value to one of the said bands, means for transmitting a corresponding plurality of signals from the transducer to the receiver, each signal being associated with a respective one of the bands and denoting whether or not the parameter value falls within that band, and data analysing means adjacent the receiver for producing a meaningful output from the signals if and only if one and only one of the signals indicates that the parameter value falls within its range.

A third aspect of the invention provides a system for transmitting data from at least one transducer to a data receiver comprising a variable acquisition rate monitor for controlling the rate at which data is fed from the said at least one transducer to the data receiver, the monitor having an input for receiving data from the said at least one transducer, an output for sending data to the data receiver, and control means for controlling the rate at which data is fed from the output, the control means operating in dependence on the data received at the monitor input and/or the data received at the monitor input.

A fourth aspect of the invention provides a system for transmitting data from at least one transducer to a data receiver, comprising a variable resolution monitor for controlling the resolution of data fed from the said at least one transducer to the data receiver, the monitor having an input for receiving data from the said at least one transducer, an output for sending data to the processing device, and control means for controlling the resolution of data fed from the output, the control means operating in dependence on analysis of data already received by the data receiver and/or the data received at the monitor input.

In the third and fourth aspects of the invention, the data receiver may comprise a data store, in which case the monitor may be connected to receive a signal from the data store to control the rate at which data is fed from the output in dependence on the available capacity of the store. Such control may be effected instead of or in addition control in dependence of the factors already recited.

A fifth aspect of the invention provides a system for analysing data fed to a processing device regarding a parameter, wherein the parameter varies within a range which is sub-divided into a plurality of overlapping bands, and the processing device analyses values of the parameter which fall into an overlap between adjacent bands twice, once on the basis on the assumption that the parameter falls into one of the adjacent bands and once on the assumption that it falls in the other of the adjacent bands.

BRIEF DESCRIPTION OF THE DRAWINGS

The various aspects of the invention set out above are described in more detail with reference to the accompanying diagrammatic drawings, in which.

DESCRIPTION OF THE PREFERRED EMBODIMENTS

The use of decision tables in checking for deviations from normal in operating conditions It has been recognised as desirable to provide a "black box" system, on a parallel with those used in aircraft to record parameters of aircraft operation, for use in a chemical manufacturing plant. The following description of the invention is concerned primarily with such plants, though it should be appreciated that the invention is capable of much wider application. For example, it would be equally applicable to power generating plants, such as nuclear power stations. The system would monitor operational parameters of the plant and record those parameters at least immediately prior to a situation representing a potential operating hazard. It should also be appreciated that the invention is applicable not only to the monitoring of hazards but also where it is desired to monitor any abnormalities in operation of a process.

In a typical chemical plant there will be a considerable number of parameters to be taken into account. These could include parameters associated with the process, environmental conditions and actions taken by personnel controlling the process. By way of example, consider a fairly simple plant in which the number of relevant process parameters was 40. The parameters would be such items as temperatures, pressures, flow rates, and the ratio of one chemical component to another, measured at various points in the plant. Now suppose that each parameter is considered as having one of three states, for example, HIGH, LOW AND NORMAL. It will be apparent that the total number of possible combinations of the various states of the parameters is $3^{40}$ [approximately $10^{19}$]. Each of these combinations represents an operating condition of the plant, which may be a non-hazardous condition or may be hazardous to a particular degree.

The analysis of this large number of possible conditions is a difficult task. However, a suitable tool is available for the task in a method analogous to what are known as decision tables. Further information on these tables can be found in, for example, "*Decision Tables: Theory and Practice*" by Solomon L. Pollack, Harry T. Hicks Jr. and William J. Harrison, published by Wiley Interscience [1971]. Decision table theory makes it possible to reduce the large number of combinations mentioned above to a set of "rules", each rule being associated with a different event.

Figure 1:
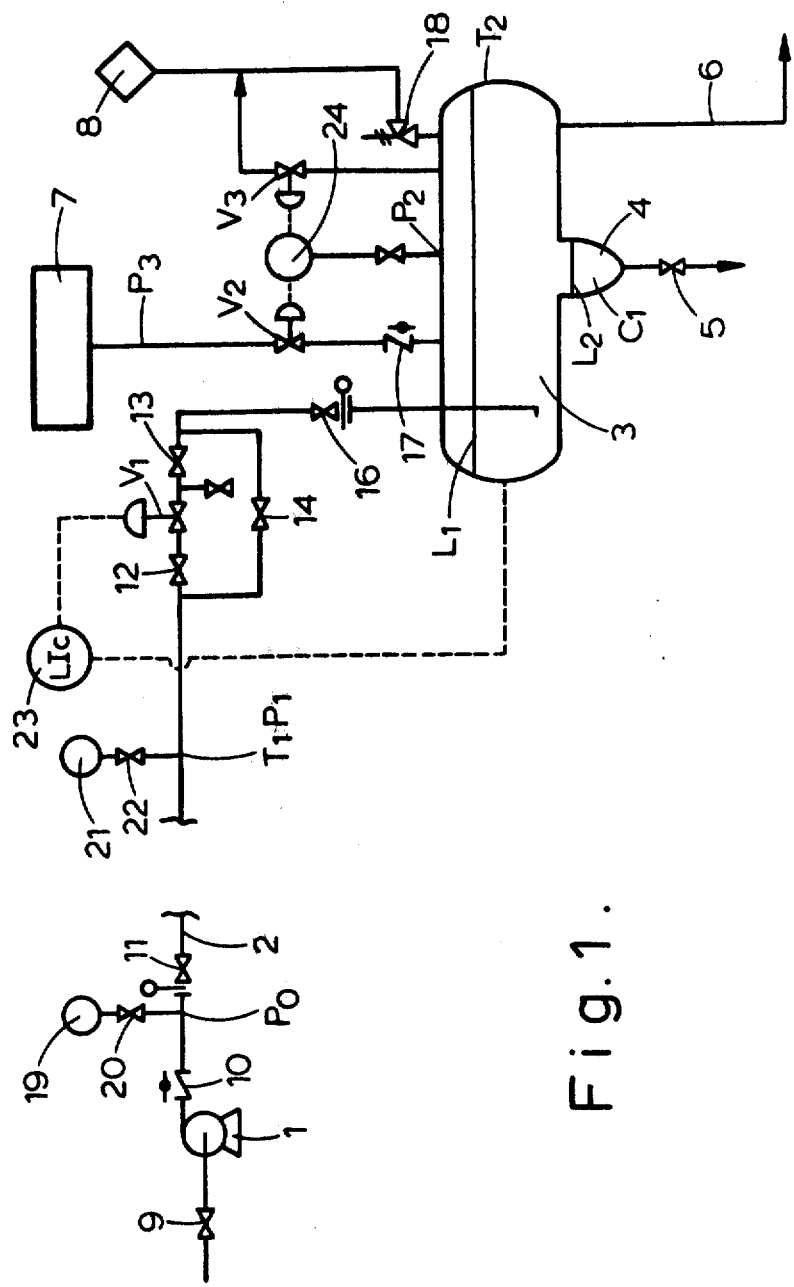
FIG. 1 is a flow diagram of a butadiene transfer process, used as an example of a process which can be controlled by the system of the first aspect of the invention.

This analysis will now be further described by reference to a specific example which relates to a chemical process, namely a butadiene transfer system. FIG. 1 of the accompanying drawings is a sketch of the relevant plant section.

Butadiene containing small amounts of suspended water is pumped from an intermediate storage reservoir [not shown] by a pump 1 via a pipeline 2 approximately 1 km in length to a buffer and settling tank 3. Residual water settles out in the tank 3 into a water sump portion 4 thereof from where it can be led away via a valve 5 to a drain. This water, which adversely affects the process for which the butadiene is to be used, can be led off by opening the valve 5 manually at intervals. Butadiene free of residual water is led from the tank 3 through an outlet line 6 to a point of use. To prevent the formation in the tank 3 of a potentially explosive mixture of butadiene vapour and air, nitrogen gas is fed into the tank from a nitrogen supply 7. Excess gases from the tank are led to a relief flare 8 where any butadiene therein is burned off.

Besides the valve already referred to, flow in the system is controlled by a number of valves, as follows. Butadiene passes from the intermediate storage reservoir to the pump 1 via a controllable valve 9, and from the pump it passes through a pair of valves 10 and 11 before entering the pipeline 2. Valve 11 is an isolating valve enabling the pipeline to be completely disconnected if necessary, for example for repair. At the other end of the pipeline the butadiene passes through a valve 12, V1 and 13 in parallel with a bypass valve 14. The operation of the valve V1 is described in more detail below. The valves 12 and 13 can, if need be, be shut off to isolate the section of pipe between them, and a drain valve 15 is provided for draining that section. The butadiene then passes through a further isolation valve 16 before entering the tank 3.

Flow of nitrogen into the tank 3 is controlled by a valve V2 [described in more detail below] and a further valve 17. Flow of nitrogen and other gases out of the tank is controlled by a valve V3 [described in more detail below] and a spring-loaded relief valve 18, which operates at a predetermined pressure if the valve V3 fails to open.

Monitoring and control of the system is effected by a number of additional components. The pressure Po at the upstream end of the pipeline 2 is measured by a gauge 19 connected to the pipeline via an isolating valve 20. The pressure P1 at the other end of the pipeline 2 is measured by a gauge 21 connected to the pipeline by an isolating valve 22. The temperature T1 at that point is also measured by a measuring device [not shown]. The level L1 of butadiene in the tank is measured by a level measuring device 23 which controls the valve V1 in dependence thereon. The pressure P2 in the tank 3 is measured by a gauge 24 which controls the valves V2 in dependence thereof with the aim of so controlling the flow of nitrogen into the tank and nitrogen and other gases out of the tank that the value of P2 remains substantially constant. Additional sensors [not shown] are provided to measure the level L2 of water in the sump 4, the pH value C1 of the water and the temperature T2 in the tank 3. Under normal operating conditions, Po=40 psig, P2=20 psig and T1=T2=20° C.

A consideration of this system enabled the following events resulting in potentially hazardous situations to be identified.

| SUMMARY OF POSSIBLE EVENTS RESULTING IN POTENTIALLY HAZARDOUS SITUATIONS | | |
|---|---|---|
| Event | Description | Potential Hazard Level |
| 1 | No butadiene available at intermediate storage. | 3 |
| 2 | Pump 1 running when tank 3 is full. | 4 |
| 3 | Pump 1 fails. | 3 |
| 4 | Blockage in line between pump 1 and tank 3 or isolation valve in that line closed in error with pump 1 running. | 4 |
| 5 | Level control valve V1 fails shut. | 3 |
| 5a | Level control valve V1 fails shut with pump 1 running. | 4 |
| 6 | Line fracture of leaking line flange, or valve stub in the line not blanked and leaking. | 9 |
| 7 | Level control valve V1 fails open or level control valve bypass open in error. | 4 |
| 8 | Thermal expansion in an isolated valved section due to fire or strong sunlight. | 6 |
| 9 | High intermediate storage temperature. | 5 |
| 10 | Winter conditions. | 4 |
| 11 | More water in stream because of high water level in intermediate storage tank. | 4 |
| 12 | Higher system pressure caused by reduction in demand of process to which butadiene is being supplied. | 5 |
| 13 | Organic acids in stream, because of process disturbance upstream. | 3 |
| 14 | Transducer contradiction. | 6 |
| 15 | Buffer storage tank/[3]overfilled. | 4 |
| 16 | Low nitrogen supply. | 3 |
| 17 | Low pressure in buffer storage tank - require N2 purge. | 4 |
| 18 | High pressure in buffer storage tank require venting. | 8 |
| 19 | Valves V2/V3 malfunction without build-up of pressure. | 7 |
| 20 | Valves V2/V3 malfunction with build-up of pressure. | 9 |
| 21 | Normal delivery of butadiene | 0 |
| 22 | Demand for butadiene greater than that being supplied to tank 3. | 4 |

As is apparent from the summary, each event has a potential hazard level associated with it, the hazard level being a numerical value representing the seriousness of the hazard concerned. In the summary given the hazards are on a scale of 0 to 10, 0 representing a "no hazard" condition, 10 representing a catastrophe, and the numbers in between representing hazards of magnitude between these two extremes. The assignment of a numerical value is partly a subjective exercise, but can nevertheless be based on certain tolarably well defined criteria, such as the likely loss of life, loss of plant and area affected by the hazard. [For further details on this see Institute of Chemical Engineers Symposium Series No. 34, 1971 page 82, F. R. Farmer, "Experience in the Reduction of Risk"]

From this summary a decision table is then produced, which is as follows:

is detected as not registering N. The sub-division table is set out below.

SUB-DECISION TABLE FOR BUTADIENE TRANSFER SYSTEM

| VARIABLE | Rule |  |  |  |  |  |  |  |  |  |  |  |  |  |  |  |  |  |
|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 |
| P2 | N | LL | LL | LL | LL | HH | HH | HH | HH | L | LL | LL | LL | LL | HH | HH | HH | HH |
| V2 | C | O | O | C | C | O | O | C | C | C | O | O | C | C | O | O | C | C |
| V3 | C | O | C | O | C | O | C | O | C | C | O | C | O | C | O | C | O | C |
| P3 | N | N | N | N | N | N | N | N | N | L | L | L | L | L | L | L | L | L |
| EVENT[S] | OK | 19 | 17 | 19 | 19 | 14 | 20 | 18 | 20 | 16 | 16+19 | 16+17 | 16+19 | 16+19 | 16+14 | 16+20 | 16+18 | 16+20 |
| POTENTIAL HAZARD LEVEL | — | 7 | 4 | 7 | 7 | 6 | 9 | 8 | 9 | 3 | 7 | 4 | 7 | 7 | 6 | 9 | 8 | 9 |

It will be noted that Event 14 represents an "impossible" situation, and thus affords a check on the integrity of the transducers.

The decision table is programmed into a data processor, for example a Miproc data processor, which is a 16-bit, high speed microprocessor made by Plessey Components Limited, England. Data from transducers located in the plant being monitored is fed to the processor which analyses the data in real time on the basis of the decision table. An output system can be provided for the processor, which has facilities for displaying relevant output variables. Thus, there may be facilities for displaying:

DECISION TABLE FOR BUTADIENE TRANSFER SYSTEM

| VARIABLE | RULE |  |  |  |  |  |  |  |  |  |  |  |  |  |  |  |  |  |  |  |  |  |
|---|---|---|---|---|---|---|---|---|---|---|---|---|---|---|---|---|---|---|---|---|---|---|
|  | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| P0 | N | — | L | — | H | H | — | — | — | N | — | — | — | — | — | L | N | H | — | H | — | — |
| P1 | N | — | L | H | L | N | — | H | H | L | — | — | H | — | H | H | H | H | — | H | — | — |
| P2 | N | — | — | — | — | — | — | — | — | — | — | H | — | H | — | — | — | — | H | — | — | — |
| T1 | N | — | — | — | — | — | — | — | — | — | — | — | H | — | H | — | — | H | — | — | L | — |
| T2 | N | — | — | — | — | — | — | — | — | — | — | H | — | H | — | — | — | — | H | — | — | L |
| L1 | N | L | — | H | — | — | L | L | N | — | H | — | — | — | — | — | — | — | — | — | — | — |
| L2 | N | — | — | — | — | — | — | — | — | — | — | — | — | — | — | — | — | — | — | — | — | — |
| C1 | N | — | — | — | — | — | — | — | — | — | — | — | — | — | — | — | — | — | — | — | — | — |
| V1 | O | O | — | C | — | — | C | C | C | — | O | C | — | — | C | — | — | O | O | — | — | — |
| EVENT[S] | OK | 1 | 1 or 3 | 2 | 4 | 4 | 5 | 5a | 5a | 6 | 7 | 8 | 8 or 9 | 8 or 9 | 8 or 12 | 8 or 14 | 8 or 14 | 9 | 9 | 9 or 12 | 10 | 10 |
| POTENTIAL HAZARD LEVEL | 0 | 3 | 3 | 4 | 4 | 4 | 3 | 4 | 4 | 9 | 4 | 6 | 6 | 6 | 6 | 6 | 6 | 5 | 5 | 5 | 4 | 4 |

| VARIABLE | RULE |  |  |  |  |  |  |  |  |  |  |  |  |  |  |  |  |  |  |  |  |
|---|---|---|---|---|---|---|---|---|---|---|---|---|---|---|---|---|---|---|---|---|---|
|  | 23 | 24 | 25 | 26 | 27 | 28 | 29 | 30 | 31 | 32 | 33 | 34 | 35 | 36 | 37 | 38 | 39 | 40 | 41 | 42 | 43 |
| P0 | — | H | H | — | — | — | — | — | L | — | — | L | N | — | — | N | N | N | N | N | N |
| P1 | — | H | H | — | — | — | L | N | N | — | — | H | H | — | — | N | N | N | N | N | N |
| P2 | — | — | — | H | H | — | — | — | — | L | N | — | — | — | L | — | — | — | — | — | — |
| T1 | — | L | N | — | — | — | H | H | — | — | — | — | — | — | — | — | — | — | — | — | — |
| T2 | — | — | — | L | N | — | — | — | — | H | H | — | — | — | — | — | — | — | — | — | — |
| L1 | — | — | — | — | — | — | — | — | — | — | — | — | — | H | — | N | L | H | N | L | H |
| L2 | H | — | — | — | — | — | — | — | — | — | — | — | — | — | — | — | — | — | — | — | — |
| C1 | — | — | — | — | — | L | — | — | — | — | — | — | — | — | — | — | — | — | — | — | — |
| V1 | — | O | O | — | — | — | — | — | — | — | — | O | O | C | C | O | O | O | C | C | C |
| EVENT[S] | 11 | 12 | 12 | 12 | 12 | 13 | 14 | 14 | 14 | 14 | 14 | 14 | 14 | 15 | 16 | 21 | 22 | 2+7 | 5a+14 | 5a+14 | 14 |
| POTENTIAL HAZARD LEVEL | 4 | 5 | 5 | 5 | 5 | 3 | 6 | 6 | 6 | 6 | 6 | 6 | 6 | 4 | 7 | 0 | 4 | 4 | 6 | 6 | 6 |

It will be seen that no rules are provided to correspond to Events 17 to 20. These are the subject of a separate sub-decision table in which the range of P2 is sub-divided into five bands, namely HH [very high], H [high], N [normal], L [low], LL [very low]. The sub-decision table is only brought into use if the variable P2

[i] The rule number;
[ii] The potential value;
[iii] The variables [P,T, etc.] involved in the hazard;
[iv] The nature of the hazard;
[v] The location of affected plant items or area.

Recording facilities are also provided for recording the data supplied by the transducers. The recording facilities may also record other data. In order for the system to function as a "black box", it is necessary to ensure that the data record is housed in a manner which renders it indestructible by the events which could occur in any hazard at the plant, so that a data record is available even if the plant is totally destroyed. The techniques of manufacturing such a housing are not described here in detail as they are believed to be well known from the technology associated with black box recorders in aircraft.

The system has a particular application to the analysis of the failure of a plant which is totally or virtually destroyed, so that other forms of analysis are impossible. However, it is also useful in the analysis of lesser abnormalities in plant operation. When such an abnormality has occurred, the data recorded can be used to analyse the events surrounding its occurrence, thus assisting in deciding what steps may be needed to prevent its re-occurrence.

Figure 2:
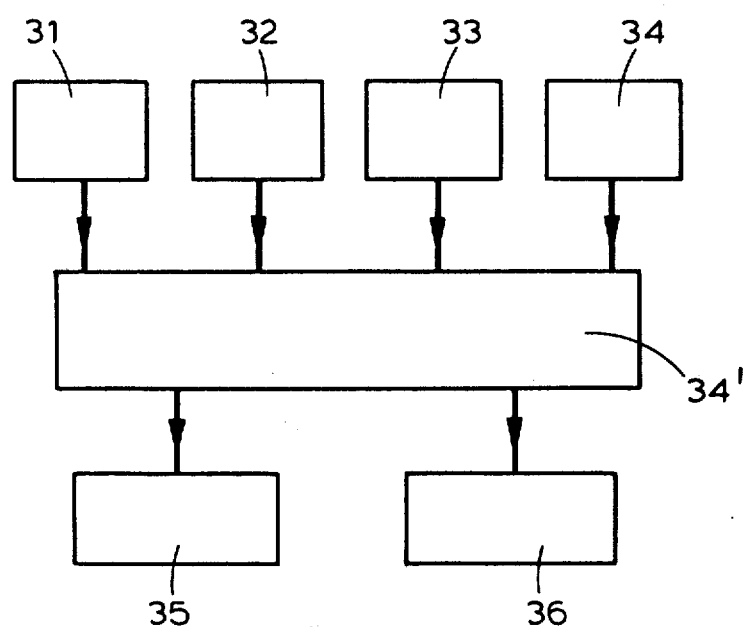
FIG. 2 is a highly schematic block diagram of part of the system of the first aspect of the invention.

FIG. 2 shows part of the system in highly schematic block diagram form.

The system comprises transducers 31, 32, 33 and 34 from which information is fed into a processor 34'. The output of the processor is fed to a display device 35 and a recording and storage device 36, for example a magnetic tape.

Figure 3:
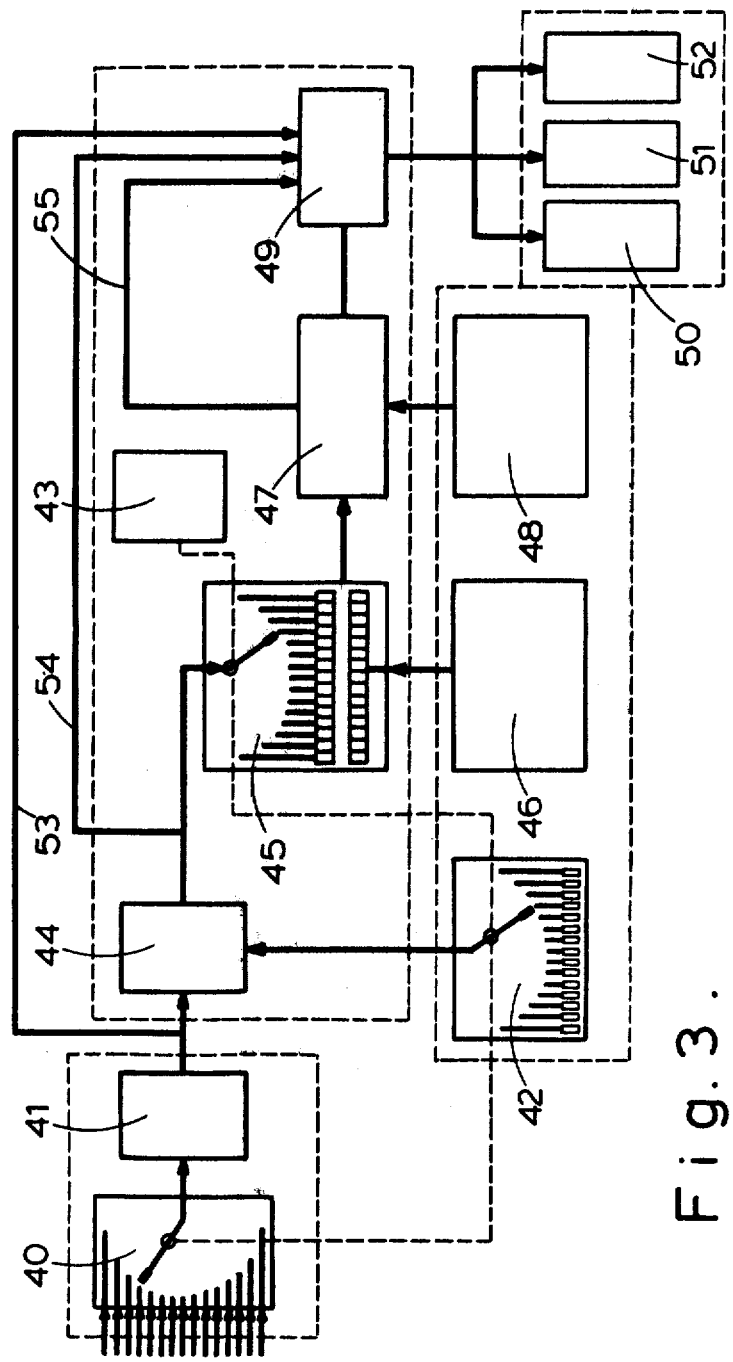
FIG. 3 shows the system of the first aspect of the invention in more detail.

FIG. 3 shows the system in somewhat less schematic form. Information in analogue form from a plurality of transducers, in this instance fifteen, is fed to a multiplexer 40. From there, information from one of the transducers, selected in a manner described below, is supplied to an analogue -digital converter 41. An algorithm store 42 contains information on the levels which the signals from the converter 41 might have. There is a separate algorithm corresponding to each transducer which divides the range of signal from the transducer into a plurality of bands. For example, for a transducer measuring temperature the algorithm might define three temperature bands corresponding respectively to low temperature, normal temperature and high temperature for that transducer.

A programmed central control unit 43 gives a "handshake" instruction, indicated by the dashed line, which causes the multiplexer 40 to transmit to the converter 41, and hence to a level discriminator 44, the signal from a particular transducer and at the same time causes the algorithm relating to that transducer to be transmitted to the discriminator. The discriminator feeds data indicative of the band within which the signal falls to a predetermined cell in a comparator 45. Each cell in the comparator corresponds to a respective transducer. The cell to which the signal from the discriminator 44 is fed is selected by the handshake instruction which selects the algorithm in the algorithm store and the particular transducer signal in the multiplexer. The control unit 43 selects each transducer in turn and corresponding data regarding each transducer signal is thus successively fed to the cells of the comparator.

At the end of one programme cycle, therefore, the comparator contains a complete record of the bands into which the signals from all the transducers fall. This record, or combination, is then compared successively with each of a plurality of combinations stored in a rule store 46. Any matches between the combination in the comparator and the combinations in the rule store are notified to an action interrogator unit 47. In effect, the unit 47 is thus notified of which rules are obeyed by the system under observation. An action store 48 contains information as the action appropriate to a finding that any particular rule is obeyed, and causes operation of an action unit 49. This gates information fed to it via lines 53, 54 and 55, and directs that certain items of information are used to control the plant via a control device 50 [for example shutting or opening a valve] and/or displayed on a display device 51 and/or recorded in a recording device 52.

The process described above is repeated at whatever intervals are required using the values of the transducer signals prevailing at that time.

Although not so illustrated, it is convenient in practice to combine the items with reference numerals 42 to 49 inclusive to a single microprocessor, such as that Miproc processor referred to above.

If the system of this aspect of the invention were used in a plant of substantial size, with a single decision table containing all the required rules for the whole plant, the resulting table would be likely to be unmanageably large.

A typical plant, however, consists of a series of functional units, each of which can be considered independently and will usually involve only a few measured variables. For example, buffer tanks or other units of considerable capacity or those involving time lags effectively isolate units on the upstream side from those downstream. Other functional units that do not involve time constants [e.g. line sections] will be directly influenced only by units immediately upstream or downstream of them. Thus a plant with 20 measurements may be divided into, say 5 units, each unit containing 4 measurements. For each unit, the number of possible combinations of parameter levels [assuming the range for each parameter is divided into three bands] is $3^4 \times 5 = 405$ instead of $3^{20}$ [ $3.5 \times 10^9$] columns for the whole plant regarded as a single unit.

In a preferred form of this aspect of the invention, therefore, a plurality of decision tables are used, each decision table containing rules relative to a respective functional unit of a plant.

1 [a] Decision rule pattern changes

As will be clear from the foregoing, when a plant is in "normal" operation a rule signifying "normal" is detected, while a given abnormality in operation will result in the detection of one or more rules signifying that abnormality. There are likely to be some abnormal plant situations which, as they develop, result in a particular sequence of rule patterns being detected. The detection of such a sequence of rule patterns can be used in some circumstances to distinguish between two different plant situations which match the same rules but in a different order.

A separate pattern decision table can be written, each column consisting of a pattern of rules. The last column contains a potential hazard rating. An example of part of such a decision table is set out below, the example relating to the same process as that to which the decision table set out above relates.

| RULE | A [Normal] | B | C | D | E | F | G | H | I |
|---|---|---|---|---|---|---|---|---|---|
| 1 | X | | | | | | | | |
| 2 | | X | | | | | | | |
| 3 | | X | | | X | | | | |
| 4 | | | | | | | | | |
| 5 | | | | | | | | | |
| 6 | | | | | | | | | |

-continued

| RULE | A [Normal] | B | C | D | E | F | G | H | I |
|---|---|---|---|---|---|---|---|---|---|
| 7 | | | X | | | | | | |
| 8 | | | X | | | | | | |
| 9 | | | | X | | | | | |
| 10 | | | | | | | | | |
| 11 | | | | | | X | | | |
| 12 | | | | | | | | | |
| 13 | | | | | | X | X | | |
| 14 | | | | | | X | | | |
| 15 | | | | | | | | | |
| 16 | | | | | | | | | |
| 17 | | | | | | | | | |
| 18 | | | | | | X | X | | |
| 19 | | | | | | X | | | |
| 20 | | | X | X | | X | X | X | |
| 21 | | | | | | | | | |
| 22 | | | | | | | | | |
| 23 | | | | | | X | | | |
| 24 | | | | | | | | | |
| 25 | | | | | | | | X | |
| 26 | | | | | | | | | |
| 27 | | | | | | | | | |
| 28 | | | | | | | | | |
| 29 | | | | | | | | | |
| 30 | | | | | | | | | |
| 31 | | | | | | | | | |
| 32 | | | | | | | | | |
| 33 | | | | | | | | | |
| 34 | | | | | | | | | |
| 35 | | | | | | | | | |
| 36 | | | | | | | | | |
| 37 | | | | | | | | | |
| 38 | X | | | | | | | | |
| 39 | | | | | | | | | |
| 40 | | | | | | | | | |
| 41 | | | | | | | | | X |
| 42 | | | | | | | | | |
| 43 | | | | | | | | | |

Various sequences of rule patterns can be identified with particular plant situations. For example, [1[ High temperature in intermediate storage upstream of the tank 3: gives the sequence of rule patterns

A→H→G→F

[2] No butadiene in tank 3 gives sequence

A→E→B

[3] Level control valve VI fails to open gives sequence

A→I→D→C

[b] Time dependent rule pattern changes

The use of the detection of rule pattern changes can be extended to include a time lag between rule patterns in a sequence. Theoretical models of the plant or practical experimentation or a combination of theory and experiment can be used to determine the approximate time lags between the expected detection of successive rule patterns in a sequence of rules. For example, in the first example given under 1[a], the lag between H and G is about 2 minutes and between G and F about 30 minutes. In the third example, the lag between I and D is less than 0.1 minutes, and that between D and C is about 5 minutes.

The processor can readily be programmed to match an actual rule pattern sequence with its time lags against a predicted rule pattern sequence with its predicted time lags. The matching of the time lags serves to reinforce the capability of the analysis to detect potential hazard situations, as well as to anticipate the rate of change of plant variables in a potential hazard situation.

It could be that more than one different situation would give rise to the same sequence of rule patterns. In order to differentiate between these different situations extra rules may be included which individually do not represent a hazard situation.

2. Transducer transmission checking

The reliability of the hazard detection system described above depends inter alia on the reliability of the information received from the transducers by the processor. A check on whether the transducers are functioning correctly is provided by the "impossible" rules in the decision table. However, it is desirable to have a further check on the reliability of the transmission of the transducer signal to the processor.

An aspect of the present invention provides a method of effecting this check. By way of example, suppose the transducer output is allocated to one of three ranges, high [H], low [L], and normal [N]. Instead of simply transmitting to the processor a single signal representing one of the three ranges, three separate signals are transmitted over three separate transmission lines or through a single transmission line, each signal being allocated to one of the three ranges and denoting whether or not the transducer output falls within that range. There are thus eight composite signals which could be transmitted, viz.

| 1 | 2 | 3 | 4 | 5 | 6 | 7 | 8 |
|---|---|---|---|---|---|---|---|
| H | H | H | H | −H | −H | −H | −H |
| N | N | −N | −N | N | N | −N | −N |
| L | −L | L | −L | L | −L | L | −L |
| | | | H | | N | L | |

[ − represents "not" ]

[ - represents "not"] Of these eight signals only three, numbers 4, 6 and 7 are self consistent, representing high, normal and low, respectively. The other signals are inconsistent and if detected indicate that there has been a transducer transmission failure. Appropriate checking and corrective action can then be taken.

Figure 4:
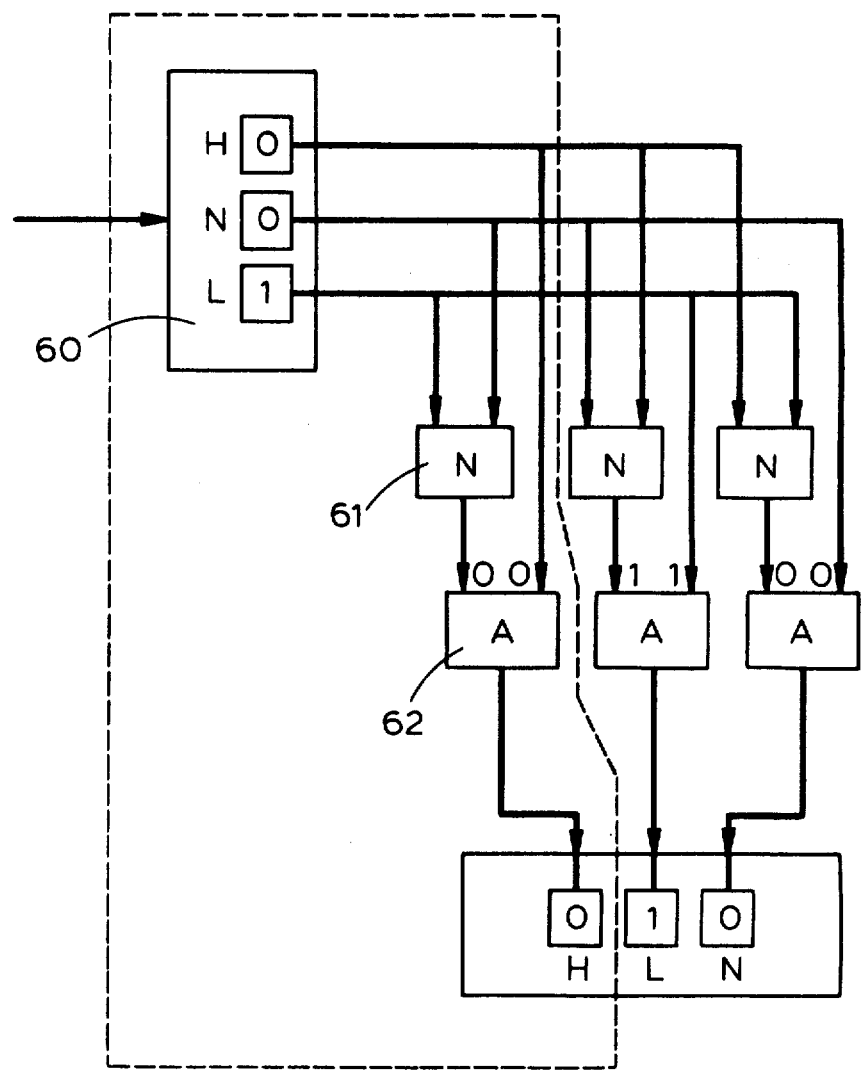
FIG. 4 is a block diagram illustrating the second aspect of the invention.

An example of a system incorporating this aspect of the invention is shown in FIG. 4. An analogue signal is fed to the input of a level discriminator 60. The signal is there level discriminated as falling within one of three bands, high [H], low [L] or normal [N]. In FIG. 4 it has been supposed that the discriminator determines that the signal is not in the high band, is not in the normal band, but is in the low band. The output of the discriminator is fed via three lines, for high, normal and low levels respectively, as binary information, with unity representing the inclusion of the analogue within the band concerned and zero its exclusion. The lines are connected in pairs to three NOR-gates 61, and the output of each NOR-gate is fed, together with a signal from the line not connected to that NOR-gate, to a respective one of three AND-gates 62. The outputs of the AND-gates provide the outputs of the system, and it will be observed that the indicated output is that the signal falls within the low band.

The discriminator 60 is adjacent the transducer which is producing the analogue signal, and the gates 61 and 62 are adjacent the signal output at the system which is using the information. The distance between the parts 60 and 61 may be considerable. In the application of this aspect of the invention to a hazard detection system according to the first aspect of the invention this distance could be as much as 1 km.

If, though some failure in transmission between the discriminator 60 and the gates 61 and 62, a signal reaches the gates 61 in a form other than one in which two of the signal components are 0 and the other component is 1 the output will read 000, thus indicating a transmission fault. Thus, if more than one signal component reaching the NOR-gates 61 has the value 1, the outputs of all of the NOR-gates 61 will be 0, and hence the output of all the AND-gates will be 0. If all the signal components reaching the NOR-gates 61 are 0, the outputs of all the NOR-gates 61 will be 1, and hence the output of all the AND-gates will be 0.

Although, for reasons of clarity, the device has been described in its parallel form, considerable advantages may accrue from serial techniques in which one NOR-gate and one AND-gate operate on the three outputs which sequentially exhibit the three combinations. This may be accomplished by a shift-register on the output of the level discriminator 60, linked with the sequential output of the device to determine the sequence for high, normal and low as shown within the dotted line boundary in the diagram.

It will be appreciated that this method can readily be extended to cases where the transducer output is allocated to a number of ranges other than three. A transducer or transmission line is under continuous surveillance for open or short circuit condition. In the event that such a condition is detected, the transducer level representing the most hazardous condition is used in the decision table.

It should also be appreciated that this method is applicable to checking the transmission of transducers in any other context, and is not restricted to use in a hazard detection system.

3. Variable acquisition rate monitor

A problem frequently encountered in control and data acquisition involves the manipulation of high resolution data from a number of sources by a central system of finite capacity. A variable acquisition rate monitor according to this aspect of the invention provides a solution to this problem by accessing the information at a rate commensurate with its importance. The method has general application to single, multiple-parallel and multiple-serial sources and the mode of operation for each device will be described. However, the principle underlying the method of operation, is most easily understood in its applicaton to a single source, and this is illustrated diagrammatically in FIG. 5, and described below.

Single Source

An analogue signal from a source not shown, forms two channels of information:

[i] A main-stream of information which is converted to a signal frequency in an analogue-frequency converter 70 and counted in a counter 71 over a time interval T which then defines the acquisition rate.

[ii] Control information which provides an instantaneous directive for the determination of the value of the interval T in the integrator. The directive is produced by the application in a transfer function generator 72 of an appropriate transfer function to the input information.

A variable resolution monitor 76 is shown connected between the counter 71 and the central system 73. This is optional, and is described below in more detail in connection with the fourth aspect of the invention.

Instead of, or in addition to, controlling the value of T in dependence on the nature of the input information, it may be controlled in dependence on the amount or nature of data already processed in some central system 73 to which the information is being fed. This is indicated by the line 74 in FIG. 5. This form of control may be used to ensure that data is fed in at a rate appropriate to the amount of space available in the data store.

Alternatively, or additionally control may be exercised on the basis of the outcome of the processing of data previously fed to the store. Thus, for example, the data already processed may indicate a situation which is of particular significance, in which case the central system may order the acquisition rate to be increased. If on the other hand the data processed indicates a situation of little significance the central system may order a reduction in the acquisition rate.

Multiple-parallel Sources

Each parallel source is treated in the same manner as a single source except that a common transfer function may be used for a group of sources to which the same control is to be supplied, by asynchronous operation of the time-averaging counters of the individual elements of this group.

Multiple-serial Sources

When information is treated serially in this device it is necessary to associate each signal with an address. This address is detached from the signal and implements the appropriate transfer function and time-averaging counter. The time-averaged signal is subsequently recombined with its address when the controlled number of cycles of serial information has been dealt with in the counter; the matching of the appropriate signal and address is obtained by the provision of synchronous access to both signal output and address lines.

As with the multiple-parallel sources, transfer functions may be assigned to groups of sources having a common control requirement but in this case the source signals are, de facto, asynchronous and special sequencing provisions are not necessary.

A variable access monitor can be used in a variety of situations where the rate at which it is desirable to utilise data is dependent on the nature of the data. One particular application is to the hazard analysis system described above. When a plant is operating normally it is not necessary to record much data about its operation. In contrast, in a situation where a serious hazard is developing, it is desirable to record as much data as possible. In intermediate situations some less detailed data record will be acceptable.

In applying the variable access monitor to hazard analysis, using a transfer function generator to control the value of the time constant in the counter the transfer function may be related to the potential hazard level determined by the decision table programmed into the processor. The higher the hazard level, the shorter is the time constant used, and hence the more frequently the average value of a particular plant parameter is read into the data store.

Figure 5:
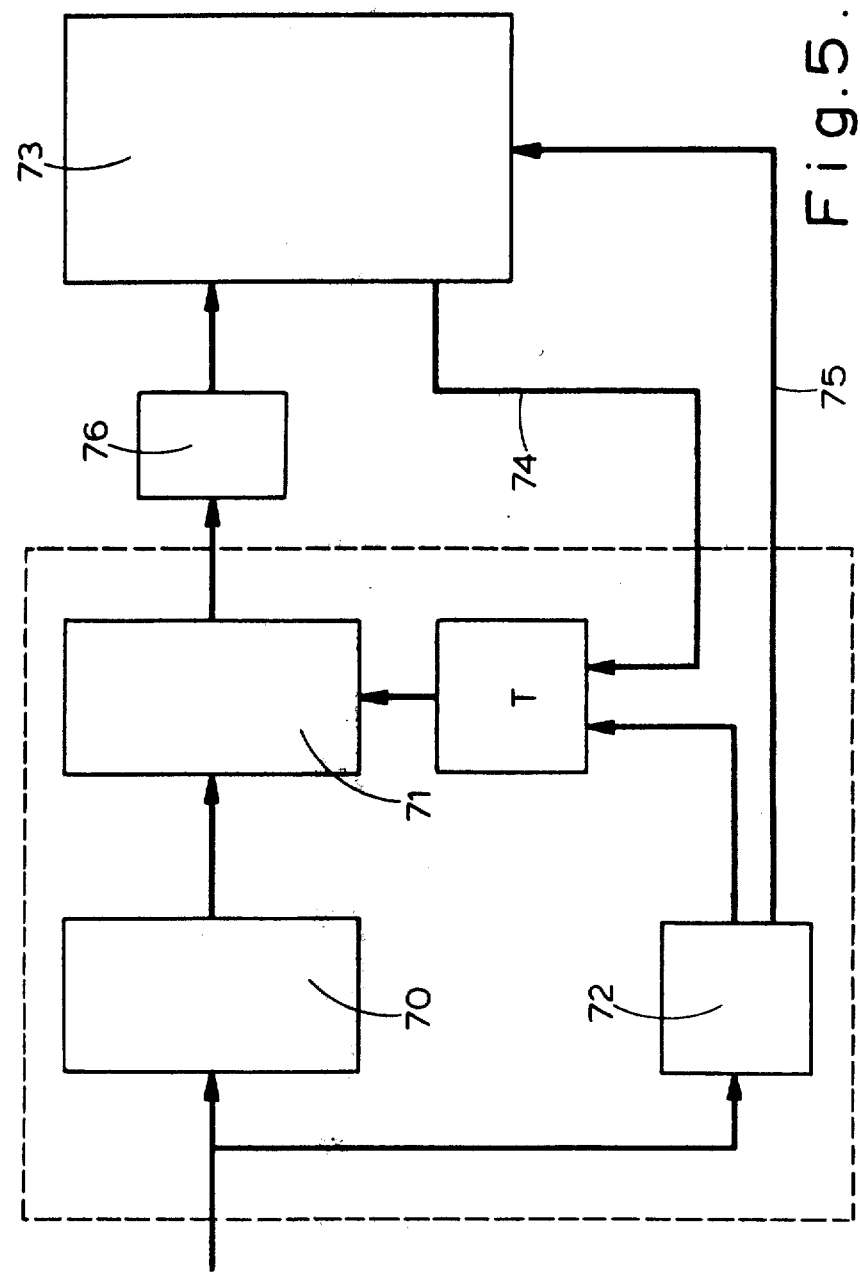
FIG. 5 is a block diagram illustrating the third aspect of the invention.

Instead of, or in addition to, the transfer function being related to the potential hazard level, it may be related to the actual values of the signals being dealt with. Yet a further alternative or additional form of control which may be applied to the transfer function is to alter it in dependence on the amount of space available in the data store, so as to use the space to the maximum efficiency without at the same time overloading it.

Where the transfer function is controlled directly by the actual values of the signals being dealt with, the transfer function generator should inform the central system of changes in the transfer function [indicated by line 75 in FIG. 5] so that appropriate adjustments can be made in the central system to receive the information at a changed rate.

Various kinds of data store can be used. If, for example, a variable speed recorder is used, the recording speed can also be controlled in the same way as the value of T.

4. Variable resolution monitor

As an alternative or addition to the use of the variable acquisition rate monitor mentioned above, the resolution of the data may be varied. Faced with a choice between storing a few inputs of high resolution and storing a large number of inputs of low resolution, this aspect of the invention provides a monitor which controls the resolution in dependence on the data input or on the state of the data store, or on the result of the processing of previously fed data.

In one form of this aspect of the invention, each input source is resolved into a number of channels, one of which transmits unmodified high resolution information and the other reduce, to varying degrees, the resolution by grouping signal levels within set bands.

Figure 6:
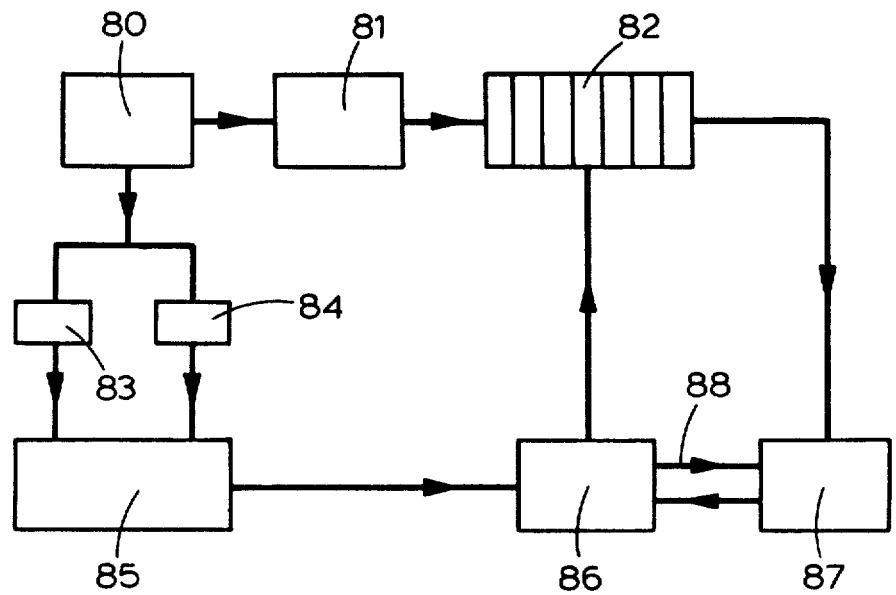
FIG. 6 is a block diagram illustrating the fourth aspect of the invention.

FIG. 6 illustrates another form of this aspect of the inventon. Data from a transducer 80 is fed in the form of an analogue signal to an analogue-digital converter 81 and from there into a buffer store 82. By way of example, this buffer store has been illustrated as being capable of holding eight binary bits, with the least significant bits at the right-hand end. Data from the transducer 80 is also fed to a pair of subtracting elements 83 and 84. The element 83 computes the modulus of the difference between the value of the signal fed thereto and a predetermined value representing an upper set limit for the signal, and the element 84 computes the modulus of the difference between the value of the signal fed thereto and a predetermined value representing a lower set limit for the signal. The outputs of the elements 83 and 84 are added in an adder 85 whose output is thus a measure of the deviation of the signal from the range bounded by the upper and lower set limits.

The output of the adder is fed to a control unit 86 which is connected to the buffer store 82. The unit 86 shifts the bits of the word in store 83 to the right by an amount dependent on the output of the adder. This causes some bits to overflow to the right hand end of the store. The more bits overflow, the lower the resolution of the data remaining in the buffer store. The data bits remaining in the store are then transferred to a central system 87, for processing. An indication of a change in resolution is also transmitted to the central system 87 from the unit 86 to allow for adjustments in, among other things, the information density on the recording medium in the data store, the formatting of output and limit settings on data capacity.

Instead of or in addition to supplying a signal to the unit 86 from the adder 85, a signal may be supplied by the central system 87. This can control the unit 80 in one or both of two ways. The first is in dependence on the amount of space available in the data store in the central system. This enables the available space to be used to the best advantage prevents more data being received in the store than there is space for. The second is in dependence on the result of data already received and processed by the system 87. For example, the data already processed may indicate a situation which is of particular significance, in which case the central system may order the resolution to be increased. If on the other hand the data processed indicated a situation of little significance the central system may order a reduction in the resolution.

Consider by way of example, a system in which a particular parameter, say a temperature T, is classified into three bands, say less than 200° C. [low], 200°–400° C. [medium], and over 400° C. [high] in a low resolution mode. Let us further suppose that there is a critical region for the temperature when it is between 400° C. and 500° C. There could then be a high resolution made in which the temperature was allocated to one of ten bands 10° C. wide subdividing the range 400° to 500° C. and an eleventh band representing over 500° C. As long as the temperature was low or normal it would only be dealt with at low resolution and recorded as being either low or normal. If however the temperature was detected as being high the temperature recording would be shifted to the high resolution mode and a record made as to which of the eleven high resolution bands the temperature was in.

5. Evaluation of data band boundaries

Where data for supply to a central storage and/or processing system is first analysed into a plurality of bands, it may be necessary to allow for the inherent stochastic nature of the boundary defining the change between adjacent levels. The method of this aspect of the invention makes use of the evaluation of boundaries between such bands. The method relies on an overlap between adjoining resolved bands and the ability of the device to provide information:

[i] as to whether the input lies in a single band or the overlap between two bands;

[ii] to identify the individual band or the two overlapping bands.

The central system then uses the overlapping situation which defines the transisition from one level to the next. This technique provides important additional information without any increase in the capacity requirements of the central system.

This aspect of the invention is particularly useful in conjunction with the first aspect of the invention, in situations where it makes a substantial difference to the hazard analysis into which of two adjacent bands a particular parameter falls. Thus, if the value of a parameter falls in an overlap region between two bands, the hazard analysis is carried out twice, once on the assumption that it falls into one of the bands and once on the assumption that it falls into the other of the bands. For the sake of safety the situation is then dealt with on the basis of whichever of these two analyses gives the highest potential hazard level.

What is claimed is:

1. A system for monitoring conditions of a plant in which chemical materials are operated upon, based upon a combination of signals representative of at least two sensed parameters within the operation, the parameters being selected from the group consisting of state variables, process variables and equipment variables, the plant comprising vessels, flow control means directing flow of materials between vessels, and material reservoirs, the monitoring system comprising:

(i) a plurality of transducers positioned within the plant to simultaneously detect the value of a plurality of operating parameters and to generate signals representative of said values;

(ii) a programmed processing device connected to receive a plurality of said signals, said processing device having:

(a) first means for producing selected combinations of said plurality of signals, (b) second means for comparing each said combination of signals with a respective normal combination signal to produce a deviation signal if said compared signal deviates from said normal combination signal, (c) the program comprising a decision table having columns each of which represents a combination of parameter values produced during operation of the process in a selected order to assign a predetermined value to a deviation signal in accordance with the location of the corresponding value of the combination signal in the decision table; whereby monitoring of the conditions of a plant is obtained by the relationship between a signal representing a combination of sensed parameters and the corresponding signal in said decision table; and (iii) receiving means comprising recording means to record the deviation signals of combinations of selected ones of said plurality of signals.

2. A system as claimed in claim 1, wherein the processing device is programmed with a further decision table whose columns each represent a different sequence of occurrence of selected ones of said combination signals.

3. A system as claimed in claim 2, wherein a predetermined time lag is associated with the interval between the occurrence of successive preselected ones of said combination signals, and means for comparing elapsed time between successively occurring combination signals of said preselected ones with the associated time lag.

4. A system as claimed in claim 1 wherein the said receiving means comprises a data store contained within a housing which is indestructible by events which could occur in the said process.

5. A system as claimed in claim 1 wherein each parameter varies within a range which is sub-divided into a plurality of bands, and the signals are analysed on the basis of the band into which the parameter concerned falls.

6. A system as claimed in claim 5, wherein the programming device is further programmed with a sub-decision table in which at least one of the parameters is divided into a greater number of bands than it is in the first mentioned decision table.

7. A system as claimed in claim 1 wherein at least one of the columns has no value assigned to at least one of the parameters.

8. A system as claimed in claim 1, including means responsive to the signal representative of at least one of the measured parameters for operating said flow control means.

9. A system as claimed in claim 1, wherein the process is carried out in a plant comprising a plurality of units operating substantially independently of each other, a plurality of said transducers is positioned to detect a plurality of said parameters and generate signals representative thereof, and the processing device is connected to receive the signals and programmed to analyze the said signals on the basis of a plurality of decision tables, one for each of the said units, each decision table having columns each of which represents a different combination of operating parameters in the respective unit.

10. A system as claimed in claim 1 wherein said deviations represent potential hazards.

11. A system as claimed in claim 10, wherein the decision table further includes at least one column representing a non-hazardous situation.

12. A system as claimed in claim 1 wherein each parameter varies within a range which is sub-divided into a plurality of overlapping bands, and the processing device analyses the signals which fall into an overlap between adjacent bands twice, once on the basis of the assumption that the parameter falls into one of the adjacent bands and once on the assumption that it falls in the other of the adjacent bands.

13. A system for monitoring the conditions of a plant in which chemical materials are operated upon, based upon a combination of signals representative of at least two sensed parameters within the operation, the parameters being selected from the group consisting of state variables, process variables and equipment variables, the plant comprising vessels, flow control means for directing flow of materials between vessels, and material reservoirs, the monitoring system comprising:

(i) a plurality of transducers positioned within the plant to simultaneously detect the value of a plurality of operating parameters and to generate signals representative of said values;

(ii) a programmed processing device connected to receive a plurality of said signals, said processing device having:

(a) first means for producing selected combinations of said plurality of said signals, (b) second means for comparing each said combination of signals with a respective normal combination signal to produce a deviation signal if said compared signal deviates from said normal combination signal, (c) the program comprising a decision table having columns each of which represents a combination of parameter values produced during operation of the process in a selected order to assign a predetermined value to a deviation signal in accordance with the location of the corresponding combination signal in the decision table; whereby monitoring of the conditions of a plant is obtained by the relationship between a signal representing a combination of sensed parameters and the corresponding signal in said decision table; and (iii) receiving means comprising recording means to record the deviations of combinations of selected ones of said plurality of signals;

each of said plurality of transducers having a signal range, said system further comprising a multiplexer connected to receive signals from the transducers, an algorithm store containing information dividing each transducer range into a plurality of bands, a level discriminator connected to the multiplexer and the algorithm store for determining within which band a signal received from the multiplexer lies, a pattern store containing the said combinations of parameter values, and a comparator connected to the pattern store and a level discriminator for successively comparing the said combinations with a combination of actual parameter values fed thereto from the level discriminator, the output of the comparator being fed to the said receiving means.

14. A system as claimed in claim 13, wherein the transducer signals are in analogue form, and an analogue-digital converter is interposed between the multiplexer and the level discriminator.

15. A system for monitoring the conditions of a plant in which chemical materials are operated upon, based upon a combination of signals representative of at least two sensed parameters within the operation, the parameters being selected from the group consisting of state variables, process variables and equipment variables, the plant comprising vessels, flow control means for directing flow of materials between vessels, and material reservoirs, the monitoring system comprising:
  (i) a plurality of transducers positioned within the plant to simultaneously detect the value of a plurality of operating parameters and to generate signals representative of said values;
  (ii) a programmed processing device connected to receive a plurality of said signals, said processing device having:
    (a) first means for producing selected combinations of said plurality of said signals,
    (b) second means for comparing each said combination of signals with a respective normal combination signal to produce a deviation signal if said compared signal deviates from said normal combination signal,
    (c) the program comprising a decision table having columns each of which represents a combination of parameter values produced during operation of the process in a selected order to assign a predetermined value to a deviation signal in accordance with the location of the corresponding combination signal in the decision table; whereby monitoring of the conditions of a plant is obtained by the relationship between a signal representing a combination of sensed parameters and the corresponding signal in said decision table; and
  (iii) receiving means comprising recording means to record the deviations of combinations of selected ones of said plurality of signals; said system further comprising a data transmission checking device connected between at least one of the transducers and the processing device, the checking device comprises means adjacent to and operatively connected with the transducer for dividing the range over which a parameter value to be transmitted may vary into a plurality of bands and allocating the parameter value to one of the said bands, means for transmitting a corresponding plurality of signals from the transducer to the processing device, each signal being associated with a respective one of the bands and denoting whether or not the parameter falls within that band, and data analyzing means adjacent to and operatively connected with the processing device for producing an output indicating a physically realizable event from the signals if and only if one and only one of the signals indicates that the parameter value falls within its range.

16. A system as claimed in claim 15 wherein each parameter range is divided into three bands.

17. A system as claimed in claim 16 wherein the said data analysing means comprises three NOR-gates each connected to receive a pair of the plurality of signals, all possible pairs of signals being supplied to a respective NOR-gate, and three AND-gates each connected to receive a signal from a respective NOR-gate and that one of the said plurality of signals which is not received by the respective NOR-gate.

18. A system for controlling the operating conditions of a chemical process, based upon a combination of signals representative of at least two sensed parameters within the chemical process, the parameters being selected from the group consisting of temperature, pressure, flow rates, and the ratio of one chemical component to another, the system comprising:
  (i) a reaction containing system comprising reaction vessels, means for directing flow of material between vessels, and reaction material reservoirs;
  (ii) a plurality of transducers positioned within the reaction system to simultaneously detect the respective values of a plurality of the operating parameters and to generate signals representative of said values;
  (iii) a programmed processing device connected to receive a plurality of said signals, said processing device having:
    (a) first means for producing selected combinations of said plurality of signals;
    (b) second means for comparing each said combination of signals with a respective normal combination signal to produce a deviation signal if said combination signal deviates from said normal combination signal;
    (c) the program comprising a decision table having columns each of which represents a combination of parameter values produced during operation of the process in a selected order to assign a predetermined value to a deviation signal in accordance with the location of the corresponding combination signal in the decision table; whereby control of a chemical process is obtained by the relationship among a combination of process parameters;
  (iv) recording means to record said deviation signals; and
  (v) means connected to said processing device for controlling the chemical process in response to any deviation of a combination of the aforesaid parameter signals from a normal combination signal;
whereby control of a chemical process is obtained by the relationship among a combination of process parameters.

19. A system as claimed in claim 18, wherein at least one of the columns of the programmed decision table represents a combination of parameter values which indicate an impossible event, whereby the receipt of such a combination of signals from the transducer indicates malfunctioning operation of the transducers.

* * * * *